United States Patent
Sunami et al.

(10) Patent No.: US 6,795,754 B2
(45) Date of Patent: Sep. 21, 2004

(54) SYSTEM FOR INSTALLING CONTROL PROGRAM IN ELECTRONIC CONTROL UNIT MOUNTED ON AUTOMOTIVE VEHICLE

(75) Inventors: Kenji Sunami, Obu (JP); Tomoyuki Kashiwagi, Chita-gun (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 10/225,249

(22) Filed: Aug. 22, 2002

(65) Prior Publication Data

US 2003/0078701 A1 Apr. 24, 2003

(30) Foreign Application Priority Data

Oct. 24, 2001 (JP) ........................................ 2001-326413

(51) Int. Cl.$^7$ ................................................ G06F 7/00
(52) U.S. Cl. .............................. 701/1; 701/32; 701/33; 701/35; 340/459
(58) Field of Search ................................ 701/1, 29, 32, 701/33, 35, 66, 97, 30; 340/439, 459

(56) References Cited

U.S. PATENT DOCUMENTS 5,491,631 A * 2/1996 Shirane et al. ................. 701/35
6,006,146 A * 12/1999 Usui et al. ..................... 701/29

* cited by examiner

Primary Examiner—Gertrude A. Jeanglaude
(74) Attorney, Agent, or Firm—Nixon & Vanderhye P.C.

(57) ABSTRACT

A control program for an electronic control unit (ECU) is installed at an end of a manufacturing line after the ECU is mounted on an automotive vehicle. The ECU common to all types of vehicles is mounted on each vehicle, and the vehicle type is identified based on data sent from the ECU to a program-installing device. The control program suitable to the identified vehicle type is formulated in the program-installing device by selecting program modules from an object library storing various types of modules and by linking those selected modules into the control program. The control program thus formulated is installed in the ECU at the end of the manufacturing line. In this manner, memory capacities both in the ECU and in the program-installing device are considerably saved.

17 Claims, 8 Drawing Sheets

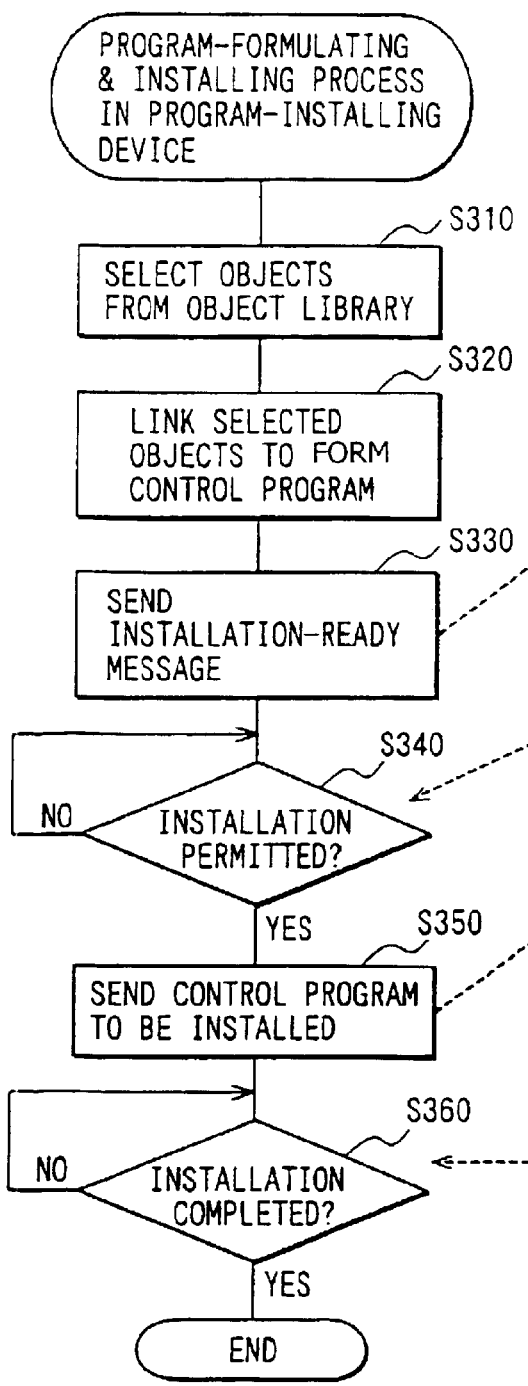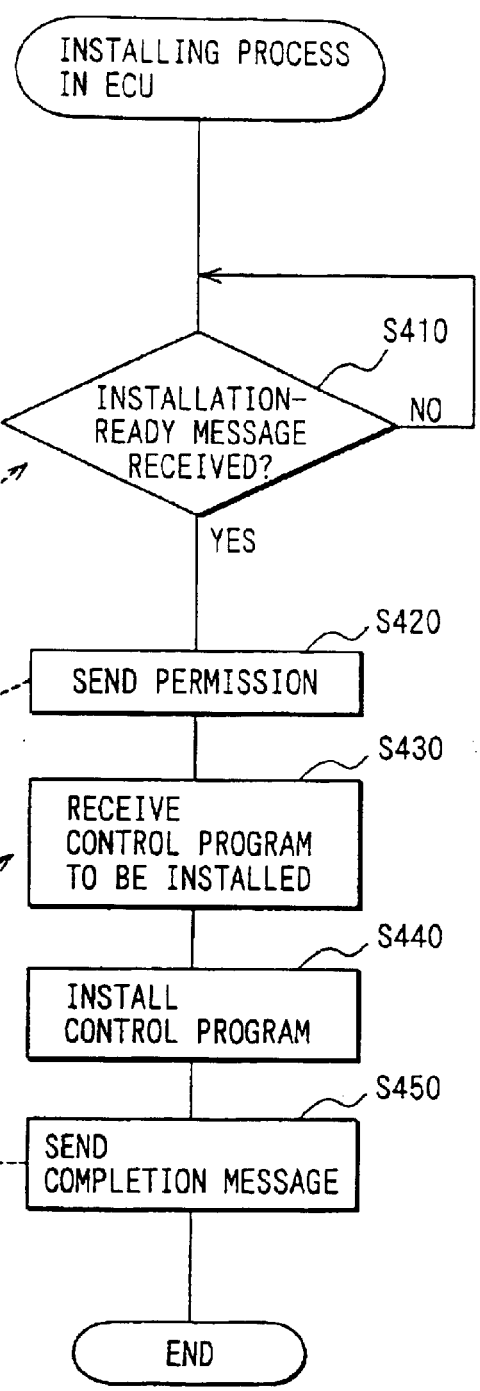

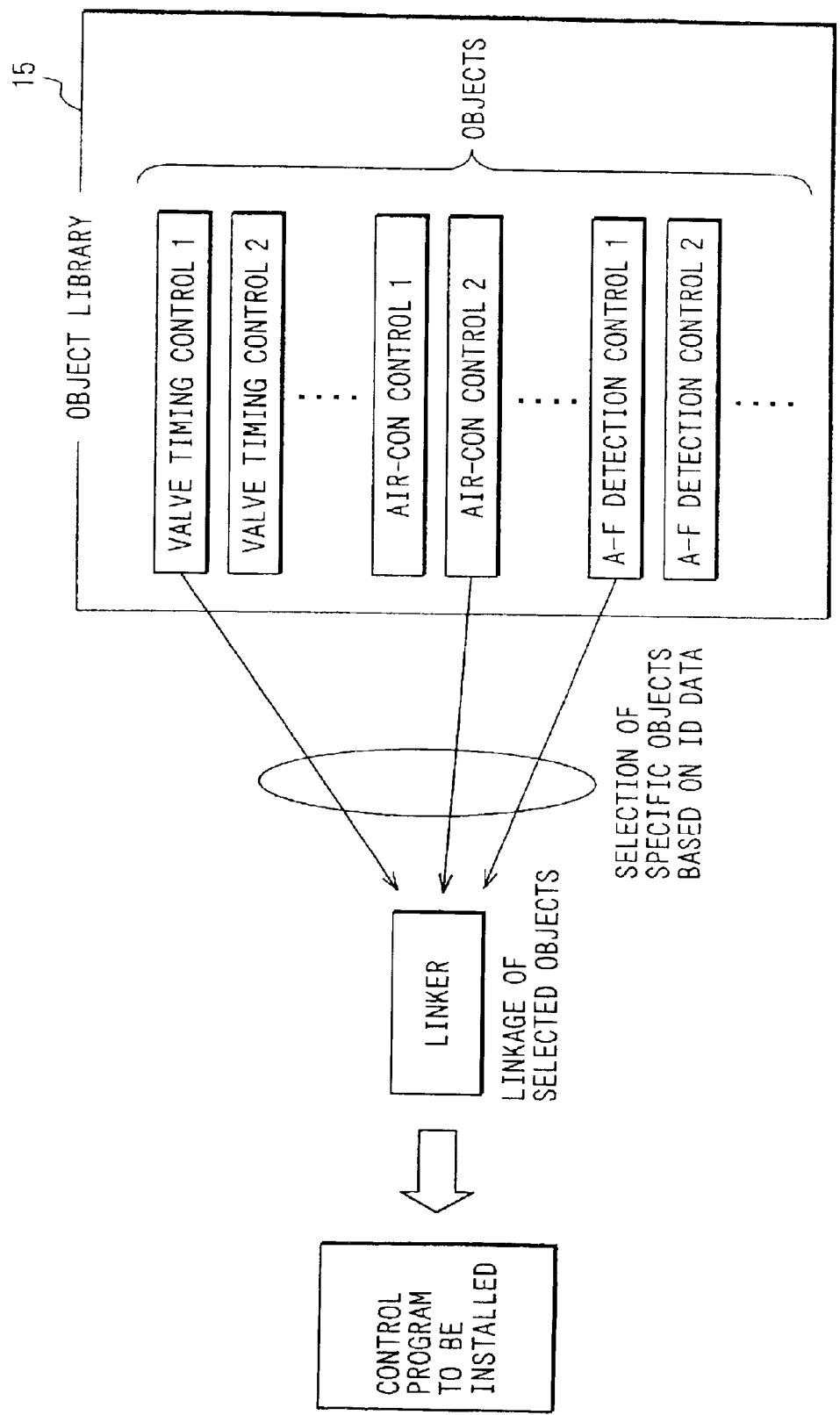

FIG. 7
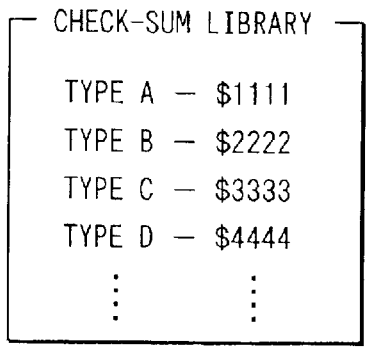
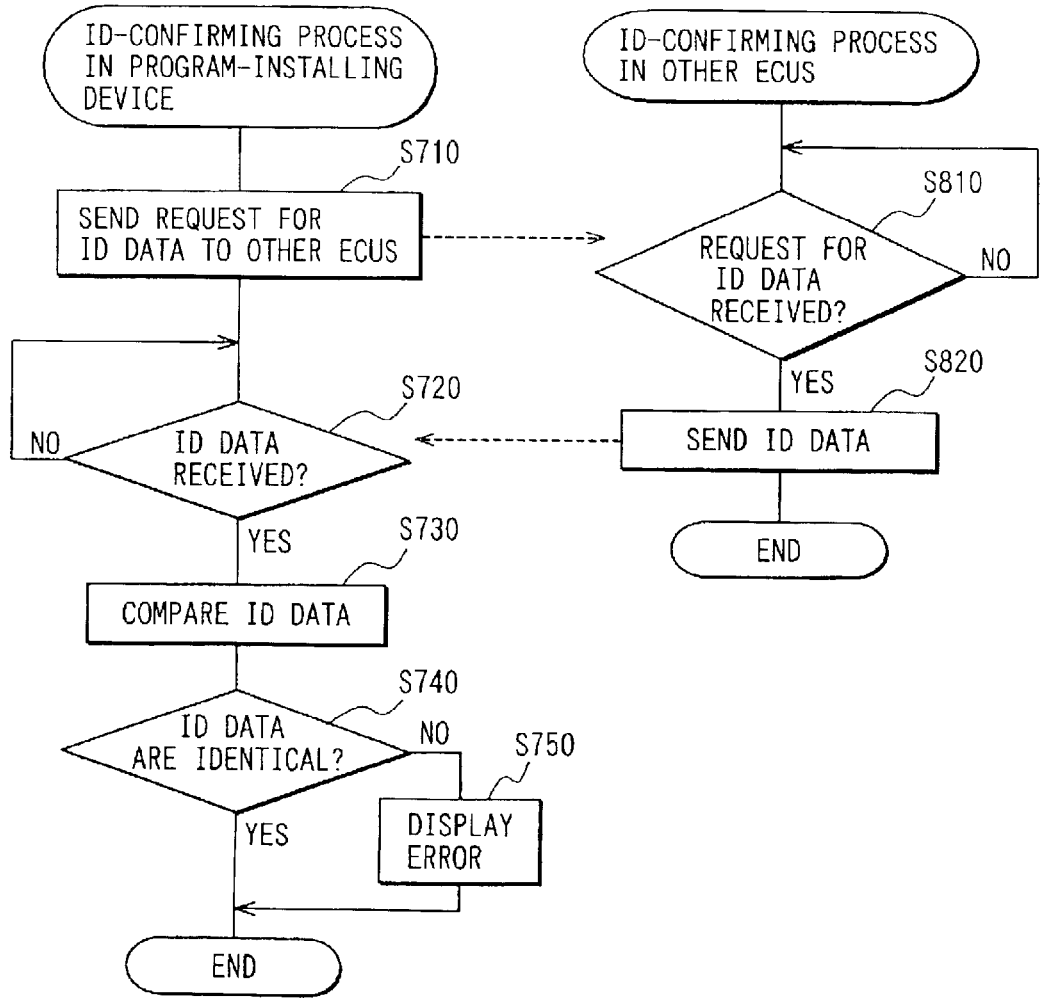
FIG. 8A
FIG. 8B

SYSTEM FOR INSTALLING CONTROL PROGRAM IN ELECTRONIC CONTROL UNIT MOUNTED ON AUTOMOTIVE VEHICLE

CROSS-REFERENCE TO RELATED APPLICATION

This application is based upon and claims benefit of priority of Japanese Patent Application No. 2001-326413 filed on Oct. 24, 2001, the content of which is incorporated herein by reference.

BACKGROUND OF THE INVENTION

1. Field of the Invention

The present invention relates to a system for installing a control program in an electronic control unit mounted on an automotive vehicle. The control program is installed at an end of a manufacturing line after the electronic control unit has been mounted on the vehicle. This system is often referred to as an end-of-line (EOL) program-installing system.

2. Description of Related Art

Recently, an electronic control unit (referred to as ECU) which is common to various types of automobile vehicles is used for reducing a manufacturing cost of the ECU. The common ECU is mounted on the various types of vehicles in a manufacturing line, and a control program specific to a vehicle type is installed in the ECU mounted on that type of vehicle at an end of a manufacturing line.

An example of the EOL program-installing system is disclosed in JP-A-4-246730. In a memory included in an ECU which is common to various types of vehicles, a code for identifying a type of vehicle on which the ECU is to be mounted and control programs covering all the types of vehicles are pre-installed in the ECU. At an end of a manufacturing line after the ECU is mounted on the vehicle, a program for selecting a control program, which is specific to the vehicle on which the ECU is mounted, from among the pre-installed control programs is installed in another memory contained in the ECU. Such an EOL program-installation is performed according to the vehicle type identifying code pre-installed in that ECU.

A memory capacity of the ECU, however, becomes unnecessarily large, because various control programs corresponding to all the vehicle types have to be stored in the memory. This makes the ECU expensive. Taking a program for controlling an air-conditioner as an example, control programs corresponding to various kinds of air-conditioners have to be pre-installed in the ECU, because it is unknown which kind of air-conditioners is used in a particular vehicle on which the ECU is mounted. Only one program actually used is selected from among many pre-installed programs, and other non-selected programs are useless. Since a large memory capacity is required in the ECU due to sophisticated electronic controls in recent automobiles, the problem of the memory capacity is becoming more serious.

On the other hand, it is conceivable to provide a blank memory region for each control function in the ECU without pre-installing programs and to install programs for each function suitable to a particular vehicle type. In this case, however, the blank memory capacity has to cover a largest capacity necessary for a particular vehicle, even though such a large capacity is unnecessary for most vehicles. For example, taking a control function for controlling air-conditioner, a large memory region for the air-conditioner control may be required in a particular vehicle type while only a small memory region is necessary for other vehicle types.

SUMMARY OF THE INVENTION

The present invention has been made in view of the above-mentioned problem, and an object of the present invention is to provide an EOL program-installing system in which a memory capacity of an ECU can be saved.

Various types of automotive vehicles are manufactured in a same manufacturing line, and an electronic control unit which is common to all vehicle types is mounted on each vehicle. In the end of line (EOL) program-installing system, a control program specific to each vehicle type is installed in the ECU at the end of the manufacturing line. The EOL program-installing system is composed of a program-installing device and each ECU mounted on the vehicle. After the ECU is mounted on the vehicle, the ECU and the program-installing device is connected through a communication cable.

The ECU mounted on the vehicle receives a signal identifying the vehicle type from the vehicle. The identifying signal may be an electric signal having a frequency specific to each vehicle type or a voltage signal having a voltage level specific to each vehicle type. Data for identifying the vehicle type is formed in the ECU based on the signal fed from the vehicle to the ECU and is sent to the program-installing device.

The program-installing device includes an object library that stores plural program modules (referred to as objects) for each control function. An object corresponding to the identified vehicle type is selected from among plural objects stored in the object library for each control function. Objects thus selected for each control function are linked together to formulate a control program to be installed in the ECU mounted on the vehicle, the type of which is identified. The formulated control program specific to that vehicle is installed in the ECU mounted on that vehicle through the communication cable connecting the program-installing device to the ECU.

Since only the control program necessary to the identified vehicle type is mounted on the ECU, a memory capacity in the ECU is considerably saved. Further, a memory capacity in the program-installing device is also saved since the control programs covering all vehicle types are formulated by selecting necessary program modules from the object library.

The program-installing system may include a function for inspecting whether the control program formulated in the program-installing device is correctly installed in the ECU. For this purpose, a checking value representing the control program actually installed in the ECU is calculated and is compared with a checking value representing the control program formulated in the program-installing device. A Check-Sum or a Cyclic-Redundancy-Check value may be used as the checking value. Further, the vehicle type identified according to the identifying data sent from one ECU may be confirmed by comparing the identifying data with other identifying data sent from other ECUs mounted on the same vehicle. Correctness of the program installation is guaranteed by the inspection and confirmation functions in the system.

Other objects and features of the present invention will become more readily apparent from a better understanding of the preferred embodiment described below with reference to the following drawings.

BRIEF DESCRIPTION OF THE DRAWINGS

FIG. 4A is a flowchart showing a process for formulating a control program and for installing the formulated control program, the process being performed in a program-installing device;

FIG. 4B is a flowchart showing a process for installing a control program, the process being performed in an ECU;

FIG. 5 is a block diagram showing a process for selecting objects from an object library and for formulating a control program to be installed;

FIG. 7 is a table showing an example of a Check-Sum library;

FIG. 8A is a flowchart showing a process for confirming an identified vehicle type with reference to other identifying data, the process being performed in a program-installing device;

FIG. 8B is a flowchart showing a process for confirming an identified vehicle type, the process being performed in another ECU.

DETAILED DESCRIPTION OF THE PREFERRED EMBODIMENT

Figure 1:
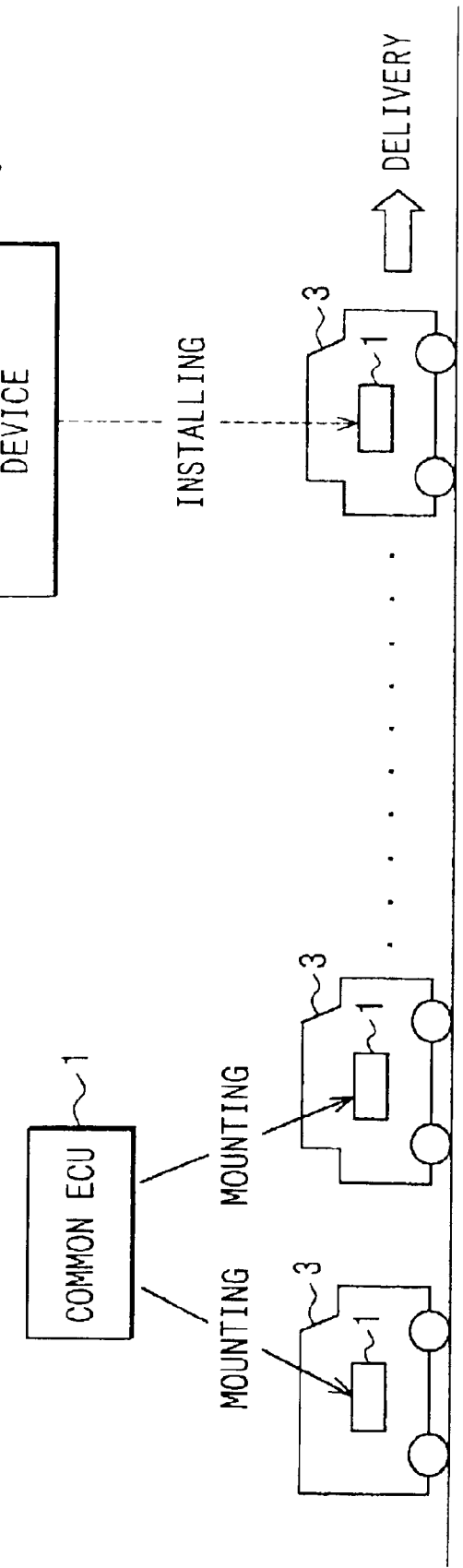
FIG. 1 is a schematic view showing a manufacturing line of automobiles including an end of the line where a control program is installed in an ECU mounted on an automobile.

A preferred embodiment of the present invention will be described with reference to accompanying drawings. As shown in FIG. 1, various types of vehicles are manufactured in a same manufacturing line. An ECU 1 which is common to all types of vehicles is mounted on each vehicle 3. At the end of the manufacturing line, a control program specific to each type of vehicle is installed in the ECU mounted on the vehicle by a program-installing device 5. After installation of the control program, the vehicles 3 are delivered to respective destinations. The program-installing system according to the present invention is used in this end of line (EOL) program-installing process.

Figure 2:
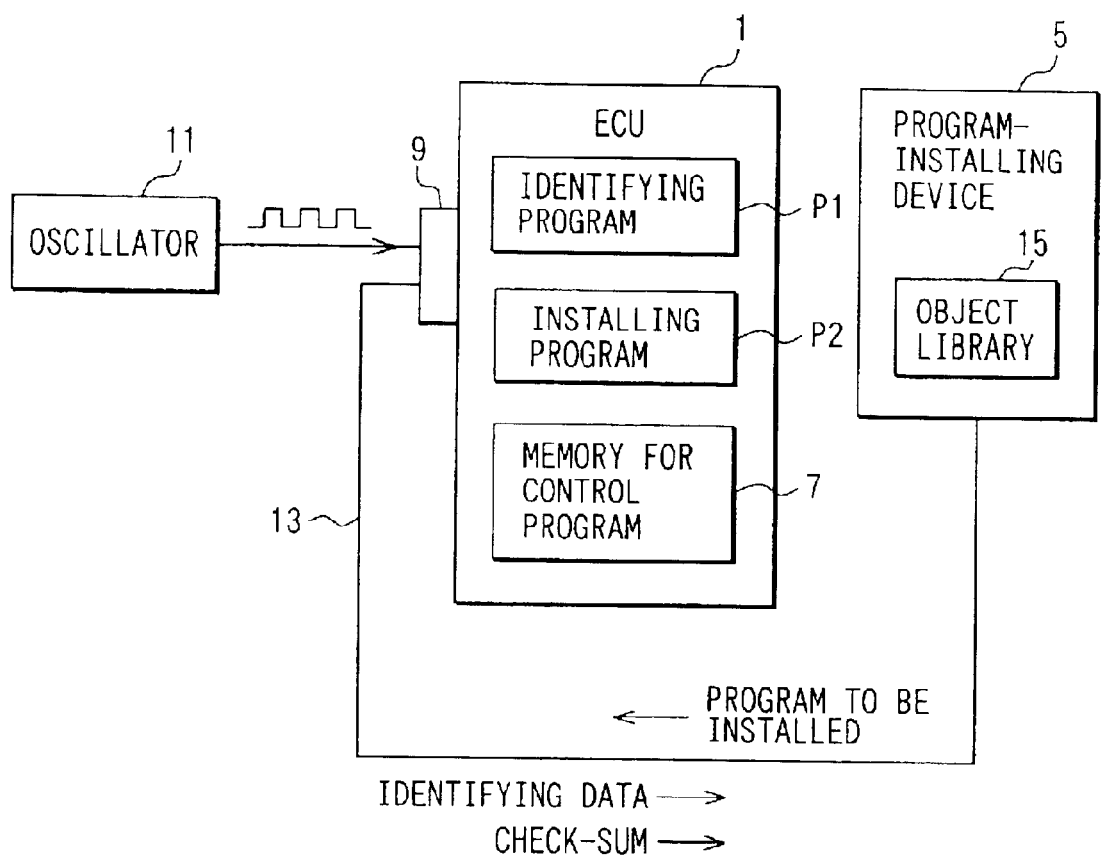
FIG. 2 is a block diagram showing a structure of a program-installing system.

As shown in FIG. 2, a program P1 for identifying types of vehicles and another program P2 for installing a control program in the ECU 1 are pre-installed in the ECU 1 when the ECU 1 is manufactured. Those programs P1 and P2 will be described later in detail. The ECU 1 also includes a memory 7 for newly storing the control program fed from a program-installing device 5. The programs P1 and P2 may be stored in a single memory device common to the control program, or the programs P1 and P2 may be stored in respective memory devices separate from the memory 7 for the control program.

An oscillator 11 for generating an identifying signal having a frequency specific to respective types of vehicles is installed on each vehicle 3. When the ECU 1 is mounted on the vehicle 3, one of terminals of a connector 9 of the ECU 1 is connected to the oscillator 11, and the identifying signal is fed to the ECU 1. A communication terminal included in the connector 9 is connected to a program-installing device 5 through a communication cable 13.

The program-installing device 5 mainly composed of a personal computer includes an object library 15. The object library 15 stores plural objects that are program modules for each control function. The object library 15 is stored in a stationary memory device such as a hard disc, or in a removable memory device such as CD-R, CD-RW or DVD. An example of the object library 15 is shown in FIG. 5. Plural objects are provided for each control function. As to a valve timing control, plural objects each corresponding to each type of vehicle (valve timing control 1, valve timing control 2 . . . ) are memorized. Similarly, as to an air-conditioner control, plural objects (air-conditioner control 1, air-conditioner control 2 . . . ) are memorized. As to an air-fuel ratio detection control, plural objects (air-fuel ratio detection control 1, air-fuel ratio detection control 2 . . . ) are memorized. For other control functions, plural objects are similarly memorized in the object library 15.

When a vehicle 3 of a certain type on which the ECU 1 is mounted is carried by a conveyor to the end of line (EOL) as shown in FIG. 1, the program-installing device 5 is connected to the ECU 1 through the communication cable 13. As shown in FIG. 2, the program-installing device 5 receives data for identifying the type of vehicle from the ECU 1 mounted on that vehicle 3. Thus, the type of that vehicle 3 is identified by the program-installing device 5. The program-installing device 5 selects an object from plural objects memorized in the object library 15 for each control function, and links those selected objects to formulate a control program to be installed in that ECU 1. The formulated control program is sent from the program-installing device 5 to the ECU 1 through the communication cable 13 as shown in FIG. 2. The control program is installed in the memory 7 of the ECU 1.

Then, the ECU 1 sends a Check-Sum of the control program installed in the memory 7 to the program-installing device 5. The program-installing device 5 compares a Check-Sum of the control program formulated therein with the Check-Sum sent from the ECU 1 thereby to inspect whether the control program is correctly installed in the memory 7. Details of this inspection process will be explained later.

Figure 3A:
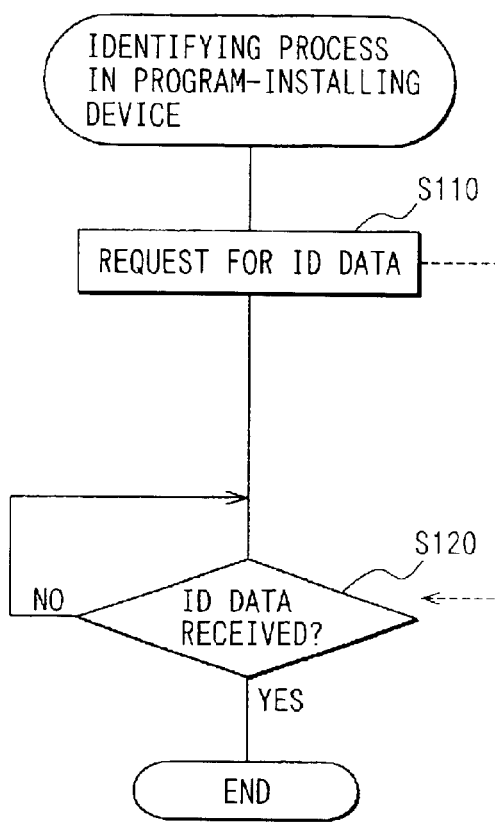
FIG. 3A is a flowchart showing a process for identifying a type of vehicle, the process being performed in a program-installing device.
Figure 3B:
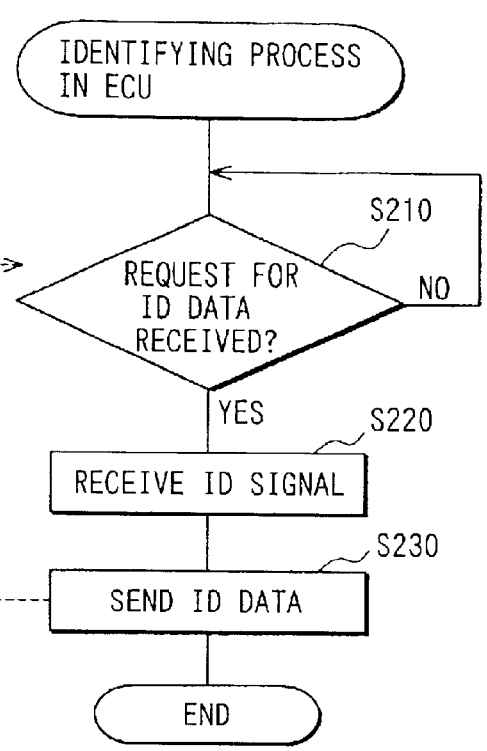
FIG. 3B is a flowchart showing a process for identifying a type of vehicle, the process being performed in an ECU.

Now, referring to FIGS. 3A and 3B, a process of identifying the type of vehicle will be explained. As the ECU 1 mounted on the vehicle 3 is connected to the program-installing device 5 through the communication cable 13, the process shown in FIG. 3A starts in the program-installing device 5, and the process shown in FIG. 3B starts in the ECU 1. At step S110, the program-installing device 5 sends a request for identifying data to the ECU 1. At step S120, whether the identifying data are received or not is checked, and the process comes to the end when the identifying data are received.

On the other hand, in the process performed in the ECU 1, at step S210 whether the request for identifying data is received or not is checked. After the request is received, the process proceeds to step S220, where the ECU 1 receives the signal identifying the vehicle type from the oscillator 11 installed on the vehicle 3. The ECU 1 detects a frequency of the identifying signal and forms identifying data to be sent to the program-installing device 5 based on the detected frequency. At step S230, the identifying data are sent to the program-installing device 5, and then the process comes to the end.

Referring to FIGS. 4A and 4B, a program-formulating and program-installing process performed in the program-installing device 5 and an installation process performed in the ECU 1 will be explained. At step S310 in the process shown in FIG. 4A, an object corresponding to the identified vehicle type is selected from plural objects stored in the object library 15 for each control function. Then, at step S320, the selected objects are linked by a linker installed in the program-installing device 5 to formulate a control program specific to the identified vehicle type. For example, "valve timing control 1" is selected from among plural objects for this function contained in the object library 15 shown in FIG. 5. Similarly, "air-conditioner control 2" and "air-fuel ratio detection control 1" are selected. Those selected objects are linked by the linker, thereby formulating a control program specific to that type of vehicle on which the ECU 1 is mounted.

Then, at step S330, a message indicating that program installation is ready is sent from the program-installing device 5 to the ECU 1. At step S340, whether the program installation is permitted by the ECU 1 is checked. As long as the ECU 1 is normally operating, this permission is sent from the ECU 1 to the program-installing device 5. After the permission is received, at step S350 the control program to be installed in the ECU 1 is sent from the program-installing device 5 to the ECU 1. Then, at step S360 whether a message indicating that the program installation is completed is received or not is checked. When the installation completion message is received, the process comes to the end.

On the other hand, in the process shown in FIG. 4B, the program-installation-ready message is received or not is checked at step S410. After that message is received, the process proceeds to step S420, where the permission for program installation is sent from the ECU 1 to the program-installing device 5. Then, at step S430 the control program to be installed is received by the ECU 1. At step S440 the control program received from the program-installation device 5 is installed in the memory 7 of the ECU 1. Then, at step S450, after the program installation is completed, the message indicating completion of the program installation is sent from the ECU 1 to the program-installing device 5. Then, the process comes to the end.

Figures 6A, 6B:
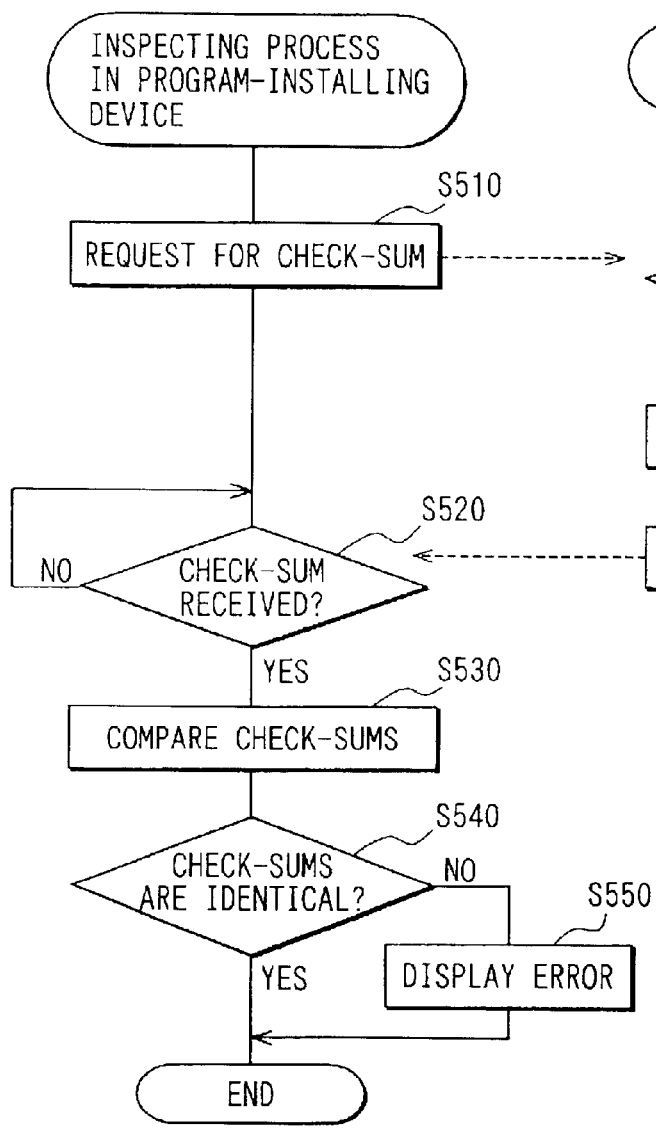
FIG. 6A is a flowchart showing a process for inspecting a control program installed in an ECU, the process being performed in a program-installing device.
FIG. 6B is a flowchart showing a process for inspecting a control program installed in an ECU, the process being performed in the ECU.

A process for inspecting whether the control program sent from the program-installing device 5 is correctly installed in the ECU 1 is explained with reference to FIGS. 6A and 6B. The process performed in the program-installing device 5 is shown in FIG. 6A, and that performed in the ECU 1 is shown in FIG. 6B. The inspection process is initiated after the program installation is completed.

At step S510, a request for sending Check-Sum of the control program installed in the memory 7 of the ECU 1 is sent from the program-installing device 5 to the ECU 1. The ECU 1 calculates the Check-Sum and sends the calculated Check-Sum to the program-installing device 5. At step S520, whether the Check-Sum is received or not is checked. After the Check-Sum is received, the process proceeds to step S530, where the Check-Sum of the control program sent to the ECU 1 (a correct Check-Sum) is compared with the Check-Sum received from the ECU 1.

A Check-Sum library (as exemplified in FIG. 7) showing the Check-Sum values each corresponding to the control program specific to each vehicle type is pre-stored in the program-installing device 5. A Check-Sum "$1111" corresponds to vehicle type A, a Check-Sum "$2222" corresponds to vehicle type B, and so on. At step S530 aforementioned, the Check Sum (the correct Check-Sum) is red out from the Check-Sum library and compared with the Check-Sum sent from the ECU 1. It is also possible to calculate the correct Check-Sum in the program-installing device 5 instead of pre-installing the Check-Sum library therein.

Then, at step S540, whether the correct Check-Sum coincides with the Check-Sum sent from the ECU 1 is determined. If both are identical, it is determined that the control program sent from the program-installing device 5 is correctly installed in the memory 7 of the ECU 1, and the process shown in FIG. 6A comes to the end. If both are not identical, it is determined that the program installation has been in failure, and the process proceeds to step S550, where an error message is shown on a display of the program-installing device 5. When the error message is shown, the program installation is repeated.

On the other hand, the ECU 1 performs the inspection process shown in FIG. 6B. At step S610, whether the request for sending Check-Sum is received from the program-installing device 5 is checked. After the request is received, the process proceeds to step S620, where the Check-Sum of the control program installed in the memory 7 is calculated. Then, at step S630, the calculated Check-Sum is sent to the program-installing device 5, and then the process comes to the end.

Figure 9:
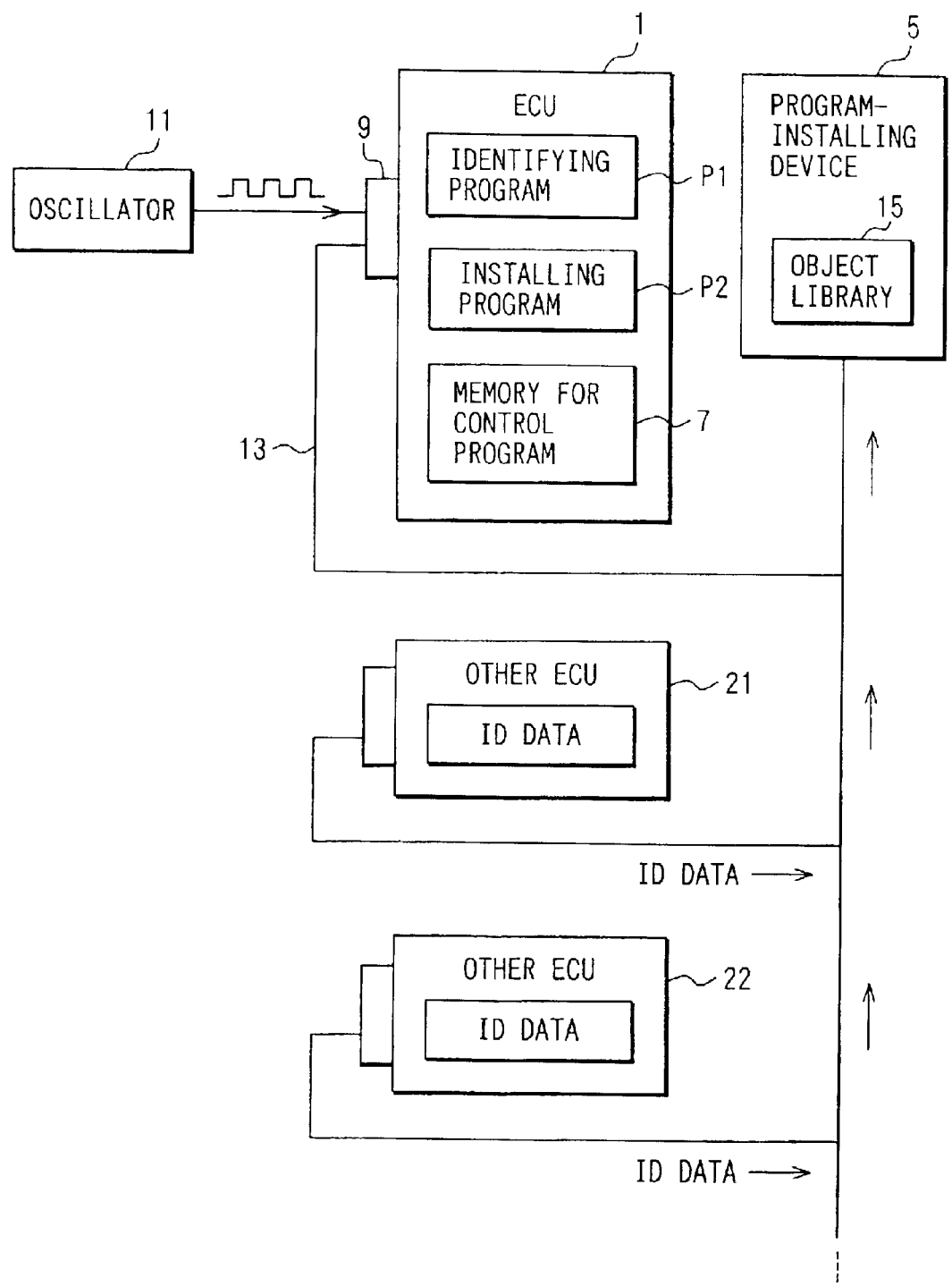
FIG. 9 is a block diagram showing a concept of a process for confirming a vehicle type.

After the inspecting process described above is completed, a process for confirming whether the vehicle type identified in the identifying process is correct or not is performed. The confirming process is shown in FIGS. 8A and 8B. The process shown in FIG. 8A is performed in the program-installing device 5, and the process shown in FIG. 8B is performed in ECUs other than the ECU 1. As shown in FIG. 9, other ECUs 21, 22 . . . in addition to the ECU 1 are mounted on the same vehicle 3 and connected to the program-installing device 5 through the communication cable 13.

At step S710 in the process shown in FIG. 8A, a request for sending the data for identifying the vehicle type is sent to the other ECUs 21, 22. Since the identifying data from the ECU 1 has been already received in the identifying process described above, the identifying data are requested to other ECUs 21, 22 in this step S710. At step S810 in the process shown in FIG. 8B, whether the request is received from the program-installing device 5 is checked. Upon receipt of the request, at step S820, the other ECUs 21, 22 send the identifying data to the program-installing device 5, and the process comes to the end. At step S720 in the process shown in FIG. 8A, whether the identifying data from other ECUs 21, 22 are received is checked. After the identifying data are received from the other ECUs 21, 22, the process proceeds to the next step S730, where the identifying data previously received from the ECU 1 are compared with the identifying data received from other ECUs 21, 22, respectively.

Then, at step S740, whether the identifying data received from the ECU 1 coincide with the identifying data received from the other ECUs 21, 22, respectively, is determined. If those data identifying the type of vehicle on which the ECUs 1, 21, 22 are mounted are all identical, it is confirmed that the type of the vehicle is correctly identified and the control program specific to that vehicle is correctly installed in the memory 7 of the ECU 1. Then, the process shown in FIG. 8A comes to the end, and the vehicle manufactured in the assembling line is delivered to its destination. If all the identifying data are not identical, it is determined that the vehicle type is not correctly identified and a control program which is not suitable to that vehicle has been installed in the memory 7 of the ECU 1, and the process moves to step S750. At step S750, an error message is displayed on a display panel of the program-installing device 5, and the process comes to the end.

The fact that the data identifying the vehicle type sent from the ECU 1 are different from those sent from the other ECUs 21, 22 suggests there is a possibility that the function of the ECU1 for forming the identifying data based on the identifying signal from the oscillator 11 is not properly working. Therefore, in this case the ECU 1 is changed to another one, and the installation of the control program is carried out again.

Following advantages are realized in the program installation system according to the present invention. Only the objects (program modules), which are specific to the type of the vehicle on which the ECU 1 is mounted, are selected from the object library 15 based on the data identifying the vehicle type, and the control program to be installed in the memory 7 of the ECU 1 is formulated by linking those selected objects. Therefore, the memory 7 of the ECU 1 is able to store any one of the control programs corresponding to respective types of vehicles, if the memory capacity is large enough to cover a largest control program among those control programs. Thus, the capacity of the memory 7 is considerably saved.

The control program for each type of vehicle is formulated by selecting proper objects from the object library 15 and by linking those selected objects. Therefore, it is not necessary for the program-installing device 5 to redundantly store objects which are commonly used in several types of vehicles. Therefore, the memory capacity in the program-installing device is considerably saved.

The ECU does not contain any information as to which type of vehicle it should be mounted on before it is mounted. The data for identifying the vehicle type is formed in the ECU based on the signal fed from the oscillator 11 of the vehicle after the ECU is mounted on the vehicle, and the identifying data are sent from the ECU to the program-installing device 5. Therefore, all the ECUs can be common to all types of vehicles not only in the hardware but also in the software.

The Check-Sum of the control program installed in the ECU is compared with the Check-Sum stored in the program-installing device 5 in order to inspect whether the control program is correctly installed in the ECU. In this manner, correctness of the control program installation in the ECU is secured.

Further, according to the present invention, the type of vehicle identified based on the identifying data sent from one ECU can be confirmed by using other identifying data sent from other ECUs mounted on the same vehicle. In this manner, it can be effectively avoided to install a wrong control program, which does not correspond to the type of the vehicle, in the ECU mounted on that vehicle.

The present invention is not limited to the embodiment described above, but it may be variously modified. For example, the oscillator 11, shown in FIG. 2, generating the signal having a frequency representing a vehicle type may be replaced with a device generating voltage levels representing respective types of vehicles. The Check-Sum of the control program used for inspecting whether the control program is correctly installed in the ECU may be replaced with a Cyclic-Redundancy-Check (CRC). Whether the control program installed in the ECU is correct or not can be inspected by comparing a CRC value stored in the program-installing device 5 with a CRC value sent from the ECU. Alternatively, the Check-Sum or the CRC value may be sent from the program-installing device 5 to the ECU, and it may be compared with that calculated in the ECU.

Further, the process for confirming the identified types of vehicles, which is performed after the control program is installed in the ECU in the foregoing embodiment, may be carried out before the control program is installed. In this manner, installation of a wrong control program can be avoided before the program-installing process.

While the present invention has been shown and described with reference to the foregoing preferred embodiment, it will be apparent to those skilled in the art that changes in form and detail may be made therein without departing from the scope of the invention as defined in the appended claims.

What is claimed is:

1. A system for installing a control program in an electronic control unit mounted on a vehicle in which the electronic control unit common to various types of vehicles is mounted on each vehicle and then the control program specific to each vehicle type is installed, the system comprising:

means for identifying the types of vehicles;

an object library storing objects each constituting a program module, controls performed by the electronic control unit being divided into a plurality of control functions, a plurality of objects each specific to each vehicle type being provided for each control function;

means for formulating the control program specific to the vehicle type identified by the identifying means, by selecting an object specific to that vehicle type from the objects stored in the object library for each control function and by linking and assembling those selected objects into the control program; and means for installing the formulated control program in the electronic control unit mounted on the vehicle, the type of vehicle being identified by the identification means.

2. The system as in claim 1, wherein:

the identifying means receives data for identifying the vehicle type from the electronic control unit mounted on the vehicle, the identifying data being formulated based on a signal specific to the vehicle type sent from the vehicle to the electronic control unit.

3. The system as in claim 2, wherein:

the signal specific to the vehicle type is an electric signal having a frequency identifying the vehicle type.

4. The system as in claim 2, wherein:

the signal specific to the vehicle type is a voltage signal having a voltage level identifying the vehicle type.

5. The system as in claim 1, wherein:

the system further includes means for inspecting whether the control program installed in the electronic control unit coincides with the control program formulated by the formulating means.

6. The system as in claim 5, wherein:

the inspecting means comprises calculating means included in the electronic control unit and comparing means included in the installing means;

the calculating means calculates a Check-Sum of the control program installed therein and sends the Check-Sum to the installing means; and the comparing means compares the Check-Sum sent from the calculating means with a Check-Sum of the control program formulated by the formulating means.

7. The system as in claim 5, wherein:
   the inspecting means comprises calculating means included in the electronic control unit and comparing means included in the installing means;
   the calculating means calculates a Cyclic-Redundancy-Check value of the control program installed therein and sends the Cyclic-Redundancy-Check value to the installing means; and
   the comparing means compares the Cyclic-Redundancy-Check value sent from the calculating means with a Cyclic-Redundancy-Check value of the control program formulated by the formulating means.

8. The system as in claim 2, wherein:
   the system further includes means for confirming the vehicle type identified by the identifying means; and
   the confirming means receives data for identifying the vehicle type from other electronic control units mounted on the same vehicle on which the former electronic control unit is mounted, compares the identifying data sent from the former electronic control unit with the identifying data received from the other electronic control units, and confirms that the vehicle type is correctly identified if all the identifying data are identical.

9. A method of installing a control program in an electronic control unit, the method comprising:
   mounting an electronic control unit, which is common to various types of vehicles, on each vehicle;
   identifying a type of a vehicle on which the electronic control unit is mounted based on identifying data sent from the electronic control unit to a program-installing device, the identifying data being formed in the electronic control unit according to a signal identifying the vehicle type fed from the vehicle to the electronic control unit;
   formulating the control program specific to the identified vehicle type in the program-installing device by selecting a program module for each control function from among program modules stored in a library and by linking and assembling the program modules selected for each control function into the control program; and
   installing the formulated control program in the electronic control unit mounted on the vehicle, the type of vehicle being identified based on the identifying data.

10. The method of installing a control program as in claim 9, the method further including:
    inspecting whether the control program formulated in the program-installing device is correctly installed in the electronic unit by comparing a check code representing the installed control program with a check code representing the formulated control program.

11. The method of installing a control program as in claim 10, the method further including:
    confirming whether the vehicle type identified based on the identifying data sent from the electronic control unit is correct by comparing the identifying data with other identifying data sent from other electronic control units mounted on the same vehicle on which the former electronic control unit is mounted.

12. A system as in claim 1, wherein the control program is installed in an electronic control unit mounted on a vehicle at the end of the manufacturing line.

13. A method as in claim 9, wherein the control program is installed in an electronic control unit mounted on a vehicle at the end of the manufacturing line.

14. The method as in claim 9, further comprising:
    inspecting whether the control program installed in the electronic control unit coincides with the formulated control program by calculating a Check-Sum of the installed control program, calculating a Check-Sum of the formulated control program and comparing the Check-Sum of the installed control program and the Check-Sum of the formulated control program.

15. The method as in claim 9, further comprising:
    inspecting whether the control program installed in the electronic control unit coincides with the formulated control program by calculating a Cyclic Redundancy Check value of the installed control program, calculating a Cyclic Redundancy Check value of the formulated control program and comparing the Cyclic Redundancy Check value of the installed control program and the Cyclic Redundancy Check value of the formulated control program.

16. A system for transmitting a control program to an electronic control unit mounted on a vehicle, the electronic control unit being common to various types of vehicles, the system comprising:
    receiver for receiving vehicle identification data from the electronic control unit mounted in the vehicle;
    an object library storing a plurality of objects each constituting a program module;
    means for formulating a control program specific to the vehicle type identified by the received vehicle identification data by selecting a subset of the objects specific to that vehicle type identified from the plurality of objects stored in the object library and by linking and assembling the selected subset of the plurality of objects into the control program; and
    means for transmitting the formulated control program to the electronic control unit mounted on the vehicle, the type of vehicle being identified based on the received vehicle identification data.

17. A method of operating a device to transmit a control program to an electronic control unit which is common to various types of vehicles, the method comprising:
    identifying a type of a vehicle on which the electronic control unit is mounted based on identifying data received from the electronic control unit;
    storing a plurality of objects each constituting a program module in an object library;
    formulating the control program specific to the identified vehicle type based on the received identifying data by selecting a subset of the plurality of objects stored in the object library and by linking the selected subset of the plurality of objects into the control program; and
    transmitting the formulated control program to the electronic control unit mounted on the vehicle, the type of vehicle being identified based on the received identifying data.

* * * * *